United States Patent [19]
Chaffee

[11] Patent Number: 4,961,202
[45] Date of Patent: Oct. 2, 1990

[54] SINGLE LINE LASER AND METHOD

[75] Inventor: Edwin G. Chaffee, Salt Lake City, Utah

[73] Assignee: American Laser Corporation, Salt Lake City, Utah

[21] Appl. No.: 396,434

[22] Filed: Aug. 18, 1989

[51] Int. Cl.⁵ .................................. H01S 3/08
[52] U.S. Cl. ........................ 372/100; 372/99
[58] Field of Search ............. 372/100, 103, 98, 61

[56] References Cited

U.S. PATENT DOCUMENTS

| | | | |
|---|---|---|---|
| 3,855,547 | 12/1974 | Kirk | 372/100 |
| 4,063,803 | 12/1977 | Wright et al. | 372/103 |
| 4,800,568 | 1/1989 | Kaueger et al. | 372/99 |
| 4,809,293 | 7/1989 | De Bell et al. | 372/103 |

OTHER PUBLICATIONS

Jaenisciv; "Ion Laseor Repair & Processing" O-E/Fiber Lase Boston '88; 7 Sep. 1988.

Primary Examiner—Lëon Scott, Jr.
Attorney, Agent, or Firm—Olive & Olive

[57] ABSTRACT

A gas laser tube assembly terminates at one end with a directly affixed selectively coated curved mirror and at the opposite end with a directly affixed selectively coated half-Littrow prism oriented such that one hundred percent (100%) purity, single line, polarized light results.

6 Claims, 2 Drawing Sheets

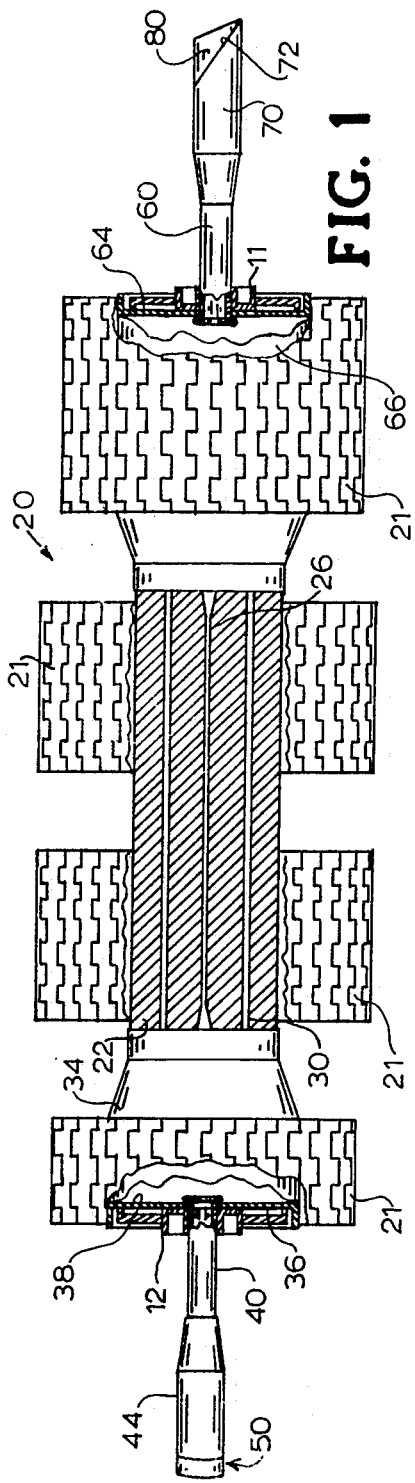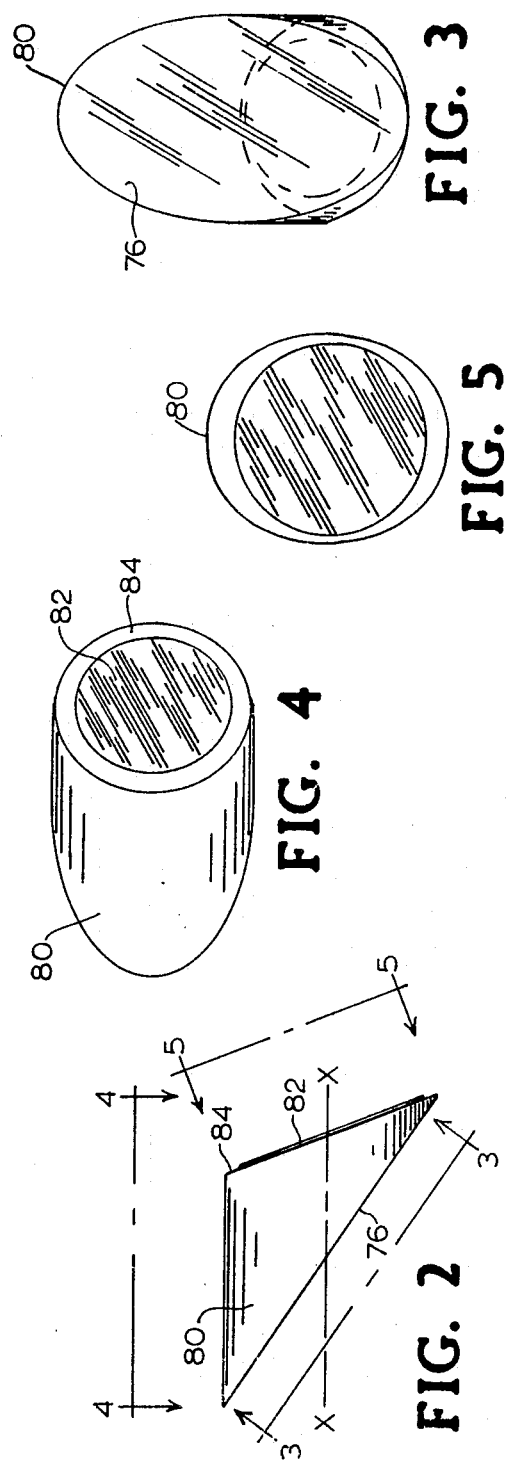

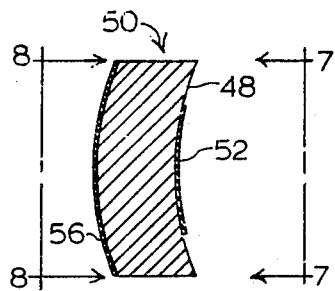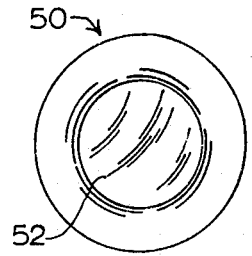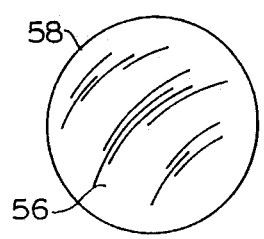
FIG. 6     FIG. 7     FIG. 8
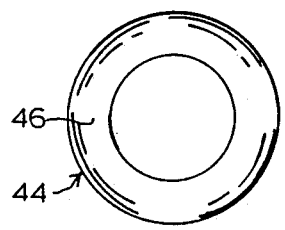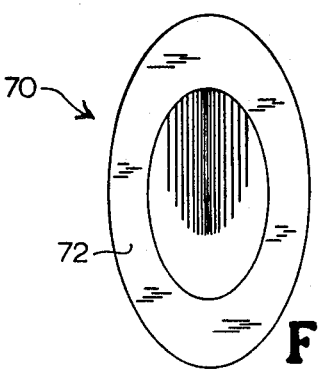
FIG. 10     FIG. 12
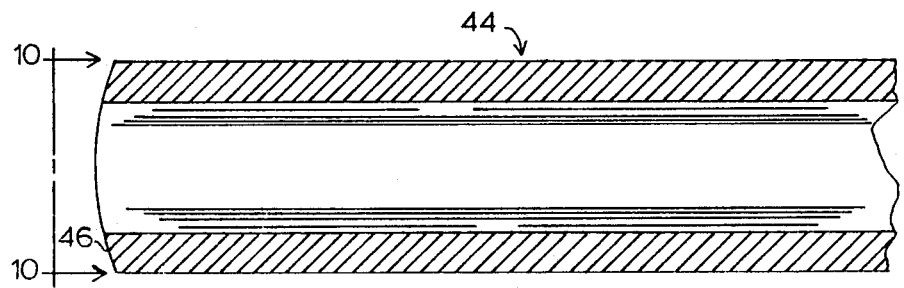
FIG. 9
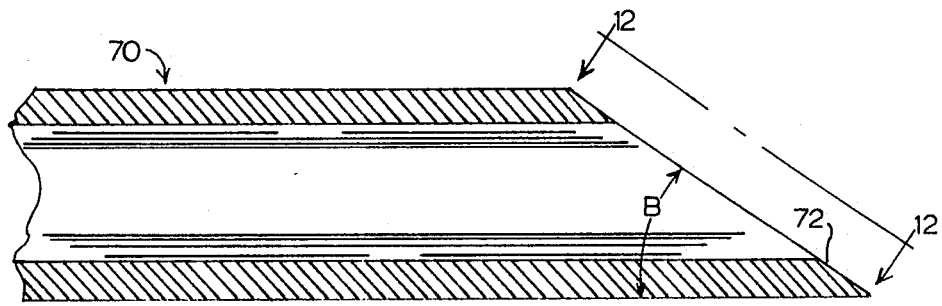
FIG. 11

SINGLE LINE LASER AND METHOD

BACKGROUND OF THE INVENTION

1. Field of the Invention

The invention relates to gas lasers and more specifically to a gas laser construction and method for obtaining a single line polarized operation in an internal mirror configuration.

2. Background Art

The advantage of one hundred percent (100%) single line operation in a gas laser such as an argon gas laser has been recognized but difficult to achieve.

It is known to use a half-Littrow prism in combination with a curved mirror to produce single line operation of a gas laser. This has been done by mounting both optical elements external of the laser tube and terminating the tube with windows placed at the Brewster angle. However, this system does not provide the several advantages of being able to use internal rather than external optics.

U.S. Pat. No. 4,746,201 refers to use of prism surfaces at the Brewster angle and schematically illustrates use of prisms within a gas laser tube but provides no specific indication of how the prisms would be mounted. Further, there is no indication of how the prisms could be replaced if contaminated after use.

With further regard to internal optics, it is known to attach optical mirrors to a gas laser tube to form an internal mirror tube as shown in U.S. Pat. No. 4,477,907. This provides what is commonly called a gas laser with integral mirrors. While not described as such, the optical mirrors referred to in the '907 patent were secured using a frit seal. However, frit seals are known to degrade when exposed to high temperature cycling and are difficult to remove if contaminated. As an improvement over frit sealed mirrors, mirrors have been attached with a cold weld to form a tube with integral mirrors. This construction is illustrated in U.S. Pat. No. 4,803,697. Various manufacturing considerations become involved when the cold weld method is employed.

In another form of internal optics for a gas laser, it is known to contact optical elements such as windows to form the tube terminations. This method as well as the cold weld method is advantageous because the elements may easily be removed during processing if they become contaminated. Thus, overall an internal optics system is to be preferred over an external optics system for a gas laser such as an argon gas laser.

With respect to achieving line purity, it is known to attach narrow band-width mirrors to reduce the number of lines produced by the laser so as to achieve ninety-five percent (95%) line purity. It has heretofore been considered virtually impossible to provide one hundred percent (100%) line purity with a mirror or window coating. The typical coating is known to be very sensitive to process variables such as temperature, pressure and the like. Thus, it would be desireable to achieve 100% line purity without total dependence on the coating employed.

It is also known to provide polarizing elements to achieve polarized light. Such an operation is achieved in a window tube by using windows at the Brewster angle and a polarized light operation is of course desireable in a gas laser.

With the foregoing in mind, there is thus a need to provide an improved gas laser construction having replaceable internal optics capable of producing one hundred percent (100%) line purity in the form of polarized light. The provision of such a laser and the method of achieving such operation thus become the principle objects of the present invention. Other objects will appear as the description proceeds.

SUMMARY OF THE INVENTION

An improved gas laser according to the construction and method of the invention utilizes a half-Littrow prism detachably mounted on one end of the tube at the Brewster angle and a curved mirror detachably mounted on the other end of the tube. The outer surface of the prism through which the laser beam passes and both surfaces of the curved mirror are suitably coated. A one hundred percent (100%) single line purity and polarized light operation are achieved with an internal optics system having replaceable optical elements.

DESCRIPTION OF THE DRAWINGS

FIG. 1 is a simplified schematic drawing of an air cooled argon laser tube assembly with the internal optics of the invention mounted thereon.

FIG. 2 is a side view of a half-Littrow prism made according to the invention, the thickness of the coating being exaggerated for illustration.

FIG. 3 is a view of the front Brewster angled prism face taken in the direction of line 3—3 in FIG. 2.

FIG. 4 is a view of the prism roof face taken in the direction of line 4—4 of FIG. 2.

FIG. 5 is a view of the rear coated prism face taken in the direction of line 5—5 of FIG. 2.

FIG. 6 is a cross-sectional view of a double face curved output mirror optical element formed according to the invention, the thickness of the coatings on the mirror face being exaggerated for purposes of illustration.

FIG. 7 is a view of the inner mirror face taken in the direction of line 7—7 in FIG. 6.

FIG. 8 is a view of the outer mirror face taken in the direction of line 8—8 in FIG. 6.

FIG. 9 is a cross-sectional view of a stub modified according to the invention for detachably mounting the curved mirror element of FIG. 6.

FIG. 10 is a end view of the FIG. 9 stub taken in the direction of line 10—10 in FIG. 9.

FIG. 11 is a cross-sectional view of another modified stub used for detachably mounting the half-Littrow prism of FIG. 2 at the Brewster angle.

FIG. 12 is an end view of the Brewster angled end of the FIG. 11 stub taken in the direction of line 12—12 in FIG. 11.

DESCRIPTION OF PREFERRED EMBODIMENT

Making reference to the drawings, FIG. 1 represents a gas laser tube assembly 20 providing a gas confining structure for an optically-radiating gas such as argon from which, for purpose of illustration, has been removed cathode, anode, housing, gas supply, power supply and other elements not germane to the invention. While adapted to either air or water cooling, tube assembly 20 is shown fitted with air cooling fins 21. Assembly 20 includes the laser tube 22 having a central bore 26 and gas return paths 30. While illustrated as a solid tube piece 22, the invention readily lends itself to the type of laser tube formed of segments such as shown in U.S. Pat. No. 4,553,241. Thus, laser tube 22 may be of the solid type as illustrated or of the segmented type as shown in the patent.

In the embodiment used for illustration, the anode shroud 34 mounts a cup member 36 having a central aperture or opening 38 in which is mounted a metal formed tubular support 40. A tubular glass stub 44 is fixed to tubular support 40 and extends outwardly therefrom providing a curved annular mounting surface 46 for detachably receiving the mating inner peripheral curved surface 48 of the output mirror assembly 50 by contact adhesion. Mirror assembly 50 has a thin broadband, output mirror coating 52 on its inner surface 48 and a thin, anti-reflection mirror coating 56 on its outer surface 58 the thickness of which is exaggerated for purposes of illustration in the drawings.

At the opposite cathode end of the assembly 20, a metal formed tubular support 60 mounts within a central aperture or opening 39 formed in a cup member 64 secured within cathode shroud 66 which in turn is mounted on the cathode end of tube 22. A tubular glass stub 70 mounts on tubular support 60 and terminates with a face 72 angled at the Brewster angle B with reference to the central axis of the tube bore 26. Brewster's angle is that angle at which a wave polarized parallel to the plane of incidence is wholly transmitted, with no reflection, and a wave polarized at right angles to the plane of incidence is substantially totally reflected. A half-Littrow prism 74 formed from a cylindrical body 80 has an uncoated prism face 76 which is detachably contact secured to the stub face 72. Prism 74 also includes a rear prism face 84 having a thin, high reflectance coating 82 the thickness of which is exaggerated for purposes of illustration in the drawings. Characteristic of a half-Littrow prism, face 84 and its coating 82 reside in a plane which is perpendicular to the laser beam transmitted through prism face 76.

In a preferred embodiment, the laser may be tuned by a plurality of set screws 11 and 12 which affect the mounting member for the tubular glass and mirror assembly 50 and cylindrical body 80. In general any method which can alter the positions of these elements 50 and 80 will tune the laser and several methods of doing this are known in the art.

Face 76 of the half-Littrow prism is cut at an angle such that the central axis X—X of the prism body 80 coincides with the central axis of the central tube bore 26 and the plane of the prism face 76 when mounted on tube face 72 resides at the Brewster angle with reference to the central axis X—X.

While the prism 74 is referred to and illustrated as being on the cathode end of the tube assembly 20 and the mirror assembly 50 as being on the anode end of the tube assembly 20, it is to be recognized that such positions could be reversed while still obtaining the desired one hundred percent (100%) single line operation.

Utilizing the known characteristics of a half-Littrow prism, it can be seen that the half-Littrow prism 74 when formed and mounted according to the invention effectively acts as a mirror, a wave length selecting element and a polarizing element. Thus, a one hundred percent (100%) single line polarized operation is achieved by the combined effect of the mirror assembly 50 and prism 74 of the invention.

What is claimed is:

1. A gas laser assembly, comprising:
   (a) a gas confining structure formed of electrically insulating material defining an envelope containing an optically-radiating gas and within said envelope a plasma guide bore;
   (b) a first tubular support member secured to one end of said structure and formed of electrically insulating material, said first support member defining a gas path extending from a first opening at one end of said envelope, said opening and the gas path within said first support member being axially aligned with said plasma guide bore, the outer end of said first tubular support being formed as a smoothly curved annular mounting surface in precisely defined orientation relative to the axis of said plasma guide bore;
   (c) a first cylindrical optical mirror element having an inner concave coated mirror surface facing inwardly of said envelope and an outer convex coated mirror surface, a peripheral portion of said inner surface conforming to and being in direct contact with said smoothly curved annular surface to thereby position said mirror surfaces in the same said precisely defined orientation relative to the axis of said plasma guide bore;
   (d) a second tubular support member secured to an opposite end of said structure and formed of electrically insulating material, said second support member defining a second gas path extending from a second opening at an opposite end of said envelope, said opposite end opening and the second gas path within said second support member being axially aligned with said plasma guide bore, the outer end of said second tubular support being formed as a planar annular mounting surface with the plane of said planar surface being at Brewster's angle relative to the axis of said plasma guide bore; and
   (e) a second half-Littrow prism element having a first planar circular uncoated surface facing inwardly of said envelope, a peripheral portion of said first planar surface conforming to and being in direct contact with said planar annular mounting surface to thereby position said first planar surface of said prism element at Brewster's angle relative to the axis of said plasma guide bore, said half-Littrow prism element having a second planar circular coated mirror surface on an outer end of said prism element residing in a plane perpendicular to the laser beam transmitted from said prism element first planar surface and adapted to selectively transmit the laser beam generated within said bore, said mirror and prism elements being operatively effective to generate a one hundred percent (100%) purity single line polarized radiation.

2. A gas laser assembly as claimed in claim 1 wherein said inner mirror surface has a broadband coating, said outer mirror surface has an anti-reflection coating and said second mirror surface has a high reflectance coating.

3. A gas laser assembly, comprising:
   (a) a gas confining structure defining an envelope containing an optically-radiating gas;
   (b) a first curved mirror element mounted directly on one end of said structure;
   (c) a second half-Littrow optical element mounted directly on an opposite end of said structure; and
   (d) said optical elements having selective coated surfaces and being oriented relative to said envelope to provide means for generating a one hundred percent (100%) purity single line polarized radiation.

4. A gas laser assembly as claimed in claim 3 wherein each of said optical elements are detachably contact secured to said structure.

5. A gas laser assembly as claimed in claim 4 wherein said first curved mirror element incorporates an inner concave mirror surface with a broadband coating and an outer convex mirror surface having an anti-reflecting coating, said half-Littrow optical element has one inner uncoated face attached to said opposite end at Brewster's angle relative to the central axis of said structure and an outer face coated with a high reflectance coating.

6. The method of generating a one hundred percent (100%) purity single line polarized radiation in a gas laser comprising generating the laser beam in a gas laser assembly in which the gas confining structure is bounded at one end by a mirror element having an inner concave coated mirror surface and an outer convex coated mirror surface and is bounded at the opposite end by a half-Littrow prism having an inner uncoated surface at Brewster's angle and an outer coated surface and utilizing coatings of a character operative in association with said mirror element and prism to produce the desired one hundred percent (100%) purity single line polarized radiation.

* * * * *